United States Patent [19]

Kano et al.

[11] Patent Number: 4,806,600

[45] Date of Patent: * Feb. 21, 1989

[54] METHYL METHACRYLATE SYRUP COMPOSITION

[75] Inventors: Taisaku Kano, Yokohama; Nobuki Kobayahsi; Yoshinobu Ichihara, both of Mobara, all of Japan

[73] Assignee: Mitsui Toatsu Chemicals, Incorporated, Tokyo, Japan

[ * ] Notice: The portion of the term of this patent subsequent to Oct. 14, 2003 has been disclaimed.

[21] Appl. No.: 82,559

[22] Filed: Aug. 7, 1987

Related U.S. Application Data

[63] Continuation of Ser. No. 852,176, Apr. 15, 1986, abandoned.

[51] Int. Cl.$^4$ .................... C08F 8/00; C08L 37/00
[52] U.S. Cl. ............................ 525/206; 525/193
[58] Field of Search ......................... 525/193, 206

[56] References Cited

U.S. PATENT DOCUMENTS

| | | | |
|---|---|---|---|
| Re. 322,261 | 10/1986 | Hirota et al. | 525/285 |
| 3,954,898 | 5/1976 | Hirota et al. | 260/837 |
| 4,042,645 | 8/1977 | Hirota et al. | 260/830 |
| 4,617,367 | 10/1986 | Watanabe et al. | 525/208 |

FOREIGN PATENT DOCUMENTS 38617 11/1973 Japan .
15090 4/1977 Japan .

*Primary Examiner*—Jacob Ziegler
*Attorney, Agent, or Firm*—Fisher, Christen & Sabol

[57] ABSTRACT

A methyl methacrylate syrup composition comprises an intimate mixture of 1–99 parts by weight of a first polymer-in-monomer syrup (A) and 99–1 parts by weight of a second polymer-in-monomer syrup (B), wherein said syrups (A) and (B) are as follows:

(A) a polymer-in-monomer syrup obtained by copolymerizing a mixture of methyl methacrylate monomer, one or more monomers having reactivity with glycidyl groups and containing at least one ethylenically-unsaturated bond, and one or more monomers not having reactivity with glycidyl groups and containing at least one ethylenically-unsaturated bond;

(B) a polymer-in-monomer syrup obtained by dissolving a copolymer obtained by copolymerizing one or more monomers containing at least one glycidyl group and one or more monomers copolymerizable with glycidyl-containing monomers, having a number average molecular weight of 1,500–50,000 and containing glycidyl groups, in a mixture of monomers comprising one or more monomers selected from the group consisting of methyl methacrylate and a monomer not having reactivity with glycidyl groups and containing at least one ethylenically-unsaturated bond, and one or more monomers having reactivity with glycidyl groups and containing at least one ethylenically-unsaturated bond, and having the resulting solution react until 1–99% of the glycidyl groups contained in the copolymer are reacted.

9 Claims, No Drawings

METHYL METHACRYLATE SYRUP COMPOSITION

This is a continuation of application Ser. No. 852,176, filed on Apr. 15, 1986, now abandoned.

TECHNICAL FIELD

This invention relates to so-called polymer-in-monomer syrup compositions containing methyl methacrylate as one of its essential component monomers and useful in the manufacture of molded articles such as kitchen counter tops and the like.

BACKGROUND ART

Syrups containing methyl methacrylate as a principal component monomer are being used in the molding of glass-fiber-reinforced plates, kitchen counter tops, washstand tops and the like, and these molded articles have very excellent performance from the viewpoint of weather resistance in that they show no tendency to yellowing. However, conventional syrups must be molded by means of pressure molding equipment because they tend to shrink during the curing process. Moreover, where they are molded in a state containing such fillers as glass fibers, silica sand, alumina and the like, the molded articles so formed have the disadvantage that a loss of gloss, whitening and the like may occur as a result of use under severe conditions such as immersion in boiling water for a long period of time.

In order to overcome the above-described disadvantages, the present inventors previously completed an invention as described below and in U.S. Pat. No. 4,617,367. According to such invention, a methyl methacrylate syrup composition comprises an intimate mixture of 1-99 parts by weight of a first polymer-in-monomer syrup (A) and 99-1 parts by weight of a second polymer-in-monomer syrup which can be either ($B_1$) or ($B_2$), wherein the syrups (A), ($B_1$) and ($B_2$) are as follows:

(A) a polymer-in-monomer syrup obtained by copolymerizing a mixture of methyl methacrylate monomer, one or more monomers having reactivity with glycidyl groups and containing at least one ethylenically-unsaturated bond, and one or more of (meth)acrylates, styrene and styrene derivatives.

($B_1$) a polymer-in-monomer syrup obtained by copolymerizing a mixture of one or more monomers containing at least one glycidyl group and at least one ethylenically-unsaturated bond, and one or more monomers selected from the group consisting of methyl methacrylate, (meth)acrylates, styrene and styrene derivatives; and ($B_2$) a polymer-in-monomer syrup containing a copolymer obtained by copolymerizing one or more monomers containing at least one glycidyl group and one or more other copolymerizable monomers, having a number average molecular weight of 1,500-50,000 and containing a glycidyl group, in one or more monomers selected from the group consisting of methyl methacrylate and (meth)acrylates, styrene and styrene derivatives.

The aforesaid composition can be molded and cured under atmospheric pressure. The molded articles so formed have not only excellent weather resistance but also especially excellent water resistance, so that they do not suffer a loss of gloss, whitening or the like upon exposure to severe conditions such as immersion in boiling water for a long period of time.

However, the molded articles made of the aforesaid composition do not have satisfactorily high impact resistance. Moreover, when they are cut with a cutter into products having desired size and shape, cracks are often produced in the cut surfaces. Thus, there is a strong demand for a syrup composition capable of overcoming these disadvantages.

SUMMARY OF THE INVENTION

The present inventor have now found that, when a composition comprising a syrup containing functional groups having reactivity with glycidyl groups and another syrup containing glycidyl groups which are partly reacted with a monomer containing an ethylenically unsaturated bond and a functional group reactive with a glycidyl group is cured by effecting radical polymerization with the aid of a catalyst such as benzoyl peroxide or tert-butyl peroxyneodecanoate and, at the same time, effecting reaction between the glycidyl groups and the functional groups having reactivity with glycidyl groups, there can be obtained molded articles which have improved impact resistance and can be cut with a cutter without producing any crack, while retaining the advantages of the above-referenced invention, i.e., the capability of being molded and cured under atmospheric pressure and of yielding molded articles having excellent weather resistance and water resistance under severe conditions. The present invention has been completed on the basis of this finding.

Thus, the present invention provides a methyl methacrylate syrup composition comprising an intimate mixture of 1-99 parts by weight of a first polymer-in-monomer syrup (A) and 99-1 parts by weight of a second polymer-in-monomer syrup (B), the sum of said first syrup (A) and said second syrup (B) being 100 parts by weight, wherein said syrups (A) and (B) are as follows:

(A) a polymer-in-monomer syrup obtained by copolymerizing to a polymerization degree of 10-60% a mixture which comprises (a) 5-95 wt.% of methyl methacrylate monomer, (b) 95-1 wt.% of one or more monomers having reactivity with glycidyl groups, containing at least one ethylenically-unsaturated bond and being copolymerizable with methyl methacrylate, and (c) 0-94 wt.% of one or more monomers not having reactivity with glycidyl groups, containing at least one ethylenically-unsaturated bond and being copolymerizable with methyl methacrylate, the sum of said monomers (a), (b) and (c) being 100 wt.%; and (B) a polymer-in-monomer syrup obtained by dissolving (d) 5-95 wt.% of a copolymer obtained by copolymerizing 3-97 wt.% of one or more monomers containing at least one glycidyl group and 97-3 wt.% of one or more monomers copolymerizable with glycidyl-containing monomers, having a number average molecular weight of 1,500-50,000 and containing glycidyl groups, in (e) 95-5 wt.% of a mixture of monomers comprising (i) one or more monomers selected from the group consisting of methyl methacrylate and the monomers defined in subparagraph (c) above and (ii) one or more monomers selected from the monomers defined in subparagraph (b) above, and having the resulting solution react until 1-99% of the glycidyl groups contained in said copolymer (d) are reacted.

BEST MODE FOR CARRYING OUT THE INVENTION

The present invention will be specifically described hereinbelow.

In the preparation of the syrup (A), the methyl methacrylate monomer (a) should be used in an amount of 5-95 wt.%, preferably 20-90 wt.% and more preferably 40-80 wt.%.

If the amount of the methyl methacrylate monomer (a) is less than 5 wt.%, the syrup composition obtained by blending the syrup (A) with the syrup (B) will have poor storage stability and show a marked increase of viscosity with time during storage. If it is greater than 95 wt.%, the molded articles made of the resulting syrup composition will have poor water resistance.

On the other hand, the one or more monomers (b) having reactivity with glycidyl groups, containing at least one ethylenically-unsaturated bond and being copolymerizable with methyl methacrylate should be used in an amount of 95-1 wt.%, preferably 50-1 wt.% and more preferably 20-1 wt.%, and the one or more monomers (c) not having reactivity with glycidyl groups, containing at least one ethylenically-unsaturated bond and being copolymerizable with methyl methacrylate should be used in an amount of 0-94 wt.%, preferably 0-79 wt.% and more preferably 0-59 wt.%.

If the amount of the former (b) is less than 1 wt.% or the amount of the latter (c) is greater than 94 wt.%, the molded articles made of the resulting syrup composition will have poor water resistance.

In the syrup (A) of the present invention, examples of the monomers (b) having reactivity with glycidyl groups, containing at least one ethylenically-unsaturated bond and being copolymerizable with methyl methacrylate include carboxyl-containing monomers such as methacrylic acid, maleic anhydride, maleic acid, fumaric acid, acrylic acid, etc.; hydroxyl-containing monomers such as 2-hydroxyethyl methacrylate, 2-hydroxypropyl methacrylate, neopentyl glycol monomethacrylate, trimethylolpropane monomethacrylate, trimethylolpropane dimethacrylate, polyethylene glycol monomethacrylate, 2-hydroxyethyl acrylate, 2-hydroxypropyl acrylate, neopentyl glycol monoacrylate, trimethylolpropane monoacrylate, trimethylolpropane diacrylate, polyethylene glycol monoacrylate, etc.; phosphorus-containing monomers such as the orthophosphoric ester of 2-hydroxyethyl methacrylate, the phosphorous ester of 2-hydroxyethyl methacrylate, the phosphoric ester of 2-hydroxyethyl acrylate, the phosphorous ester of 2-hydroxyethyl acrylate, etc.; amino-containing monomers such as N-methylaminoethyl methacrylate, 4-N-methylaminocyclohexyl methacrylate, N,N-dimethylaminoethyl methacrylate, methacrylamide, crotonamide, vinylamine, N-ethylvinylamine, allylamine, diallylamine, N-methylallylamine, N-methylaminoethyl acrylate, 4-N-methylaminocyclohexyl acrylate, N,N-dimethylaminoethyl acrylate, acrylamide, etc.; and the like. These monomers may be used alone or in admixture of two or more. Among the above-enumerated monomers, carboxyl-containing monomers are preferred, and methacrylic acid and acrylic acid are especially preferred.

In the syrup (A) of the present invention, examples of the monomers (c) not having reactivity with glycidyl groups, containing at least one ethylenically-unsaturated bond and being copolymerizable with methyl methacrylate include (1) (meth)acrylates such as ethyl methacrylate, butyl methacrylate, 2-ethylhexyl methacrylate, lauryl methacrylate, methyl acrylate, ethyl acrylate, butyl acrylate, 2-ethylhexyl acrylate, lauryl acrylate, etc.; (2) poly(meth)acrylates such as ethylene glycol dimethacrylate, polyethylene glycol dimethacrylate, neopentyl glycol dimethacrylate, trimethylolpropane trimethacrylate, ethylene glycol diacrylate, polyethylene glycol diacrylate, neopentyl glycol diacrylate, trimethylolpropane triacrylate, etc.; (3) styrene and its derivatives such as 2-methylstyrene, chlorostyrene, tert-butylstyrene, divinylbenzene, etc.; (4) fumaric esters such as dibutyl fumarate, etc.; and (5) other monomers such as vinyl acetate, Vinyl Versatate, triallyl isocyanurate, etc. These monomers may be used alone or in admixture of two or more. Among the above-enumerated monomers, those of groups (1), (2), (3) and (4) are preferred.

The syrup (A) can be prepared by stirring a mixture of the above-described monomers in a reaction vessel equipped with a stirring device and a heating and cooling device, adding thereto a catalyst such as azobisisobutyronitrile, benzoyl peroxide, tert-butyl peroxyneodecanoate, tert-butyl peroxypivalate or tert-butyl peroxy-2-ethylhexanoate and a chain transfer agent such as tert-dodecyl mercaptan, n-dodecyl mercaptan, thioglycollic acid or mercaptoethanol, and heating the resulting reaction mixture at a temperature of 50°-110° C. for a period of 3-24 hours until a polymerization degree of 10-60% is attained. If the polymerization degree is less than 10%, the molded articles made of the resulting syrup composition will have poor water resistance, while if it is greater than 60%, the resulting syrup will have unduly high viscosity and hence very poor workability.

In the syrup (B) of the present invention, the copolymer (d) containing glycidyl groups is a copolymer obtained by copolymerizing 3-97 wt.% of one or more monomers containing at least one glycidyl groups and 97-3 wt.% of one or more monomers copolymerizable with glycidyl-containing monomers, and having a number average molecular weight of 1,500-50,000. Specific examples of the monomers having at least one glycidyl group include glycidyl methacrylate, glycidyl acrylate, β-methylglycidyl methacrylate, β-methylglycidyl acrylate, allyl glycidyl ether and the like, and these monomers may be used alone or in admixture of two or more. Specific examples of the monomers copolymerizable with glycidyl-containing monomers include (meth)acrylic esters such as methyl (meth)acrylate, ethyl (meth)acrylate, butyl (meth)acrylate, 2-ethylhexyl (meth)acrylate, lauryl (meth)acrylate, benzyl (meth)acrylate, cyclohexyl (meth)acrylate, 2-hydroxyethyl (meth)acrylate, 2-hydroxypropyl (meth)acrylate, etc.; fumaric esters such as dibutyl fumarate, etc.; maleic esters; and other monomers such as (meth)acrylic acid, styrene, α-methylstyrene, vinyl acetate, (meth)acrylamide, (meth)acrylonitrile, etc., and these monomers may be used alone or in admixture of two or more.

In the preparation of the copolymer (d) having glycidyl groups, the monomers(s) containing at least one glycidyl group should be used in an amount of 3-97 wt.%. If the amount of the aforesaid monomer(s) is less than 3 wt.%, the molded articles made of the resulting syrup composition will have poor water resistance, while if it is greater than 97 wt.%, gel formation will tend to occur during polymerization. Moreover, the copolymer (d) containing glycidyl groups should have a number average molecular weight of 1,500 to 50,000. If the molecular weight is less than 1,500, the molded articles made of the resulting syrup composition will have poor water resistance, while if it is greater than 50,000, the resulting syrup will have unduly high viscosity and hence poor workability.

In the syrup (B) of the present invention, the copolymer (d) containing glycidyl groups can be one selected from the well-known polymers disclosed in Japanese Patent Publication Nos. 38617/'73, 15090/'77 and the like.

For example, there may be used polymers obtained by copolymerizing a (meth)acrylic ester of the formula

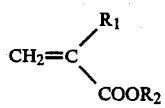
(I)

where $R_1$ is a hydrogen atom or a methyl group and $R_2$ is an alkyl group having 1 to 14 carbon atoms, with a glycidyl (meth)acrylate of the formula

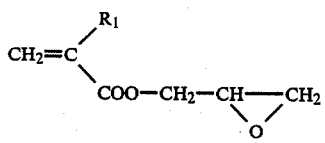
(II)

where $R_1$ is a hydrogen atom or a methyl group, and having a second-order transition point of 5°–60° C. and a number average molecular weight of 1,500–50,000 and preferably 1,500–30,000. There may also be used polymers obtained by copolymerizing a vinyl monomer such as a methacrylic ester, styrene or the like, with a (methyl)glycidyl (meth)acrylate of the formula

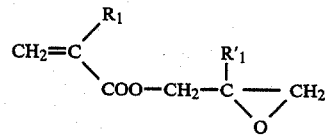
(III)

where $R_1$ and $R'_1$ are hydrogen atoms or methyl groups, and a (methyl)glycidyl (meth)allyl ether of the formula

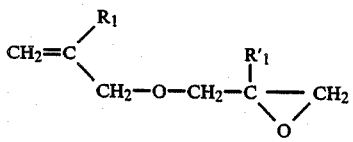
(IV)

where $R_1$ and $R'_1$ are hydrogen atoms or methyl groups, and having a softening point of 85°–150° C. and a number average molecular weight of 3,000–12,000.

In the syrup (B) of the present invention, the one or more monomers (i) constituting the mixture of monomers (e) may comprise methyl methacrylate and/or any of the monomers (c) defined above in connection with the syrup (A), i.e., the monomers not having reactivity with glycidyl groups, containing at least one ethylenically-unsaturated bond and being copolymerizable with methyl methacrylate. As the monomers (c), all of the above-enumerated monomers of groups (1), (2), (3), (4) and (5) can be used. Among them, the monomers of groups (1), (2), (3) and (4) are preferred. The monomers(s) used for this purpose may be the same as or different from the monomer(s) used in the preparation of the syrup (A). Of course, a mixture of two or more such monomers may be used.

In the syrup (B) of the present invention, the one or more other monomers (ii) constituting the mixture of monomers (e) may comprise any of the monomers (b) defined above in connection with the syrup (A), i.e., the monomers having reactivity with glycidyl groups, containing at least one ethylenically-unsaturated bond and being copolymerizable with methyl methacrylate. Among the above-enumerated monomers, carboxyl-containing monomers are preferred, and methacrylic acid and acrylic acid are especially preferred. The monomer(s) used for this purpose may be the same as or different from the monomer(s) used in the preparation of the syrup (A). Of course, a mixture of two or more such monomers may be used. In the mixture of monomers (e), the one or more monomers (ii) are present in an amount of 0.1–20 wt.% and preferably 0.5–15 wt.%.

The syrup (B) can be prepared by dissolving the above-defined glycidyl-containing copolymer (d) in the above-defined mixture of monomers (e) placed in a vessel equipped with a stirring device and then heating the resulting solution, preferably at a temperature ranging from room temperature to 108° C., until 1–99%, preferably 30–99%, of the glycidyl groups contained in the copolymer (d) are reacted. In the aforesaid reaction, there may additionally be used a catalyst (such as a tertiary amine or the like) and/or a polymerization inhibitor.

If the degree of reaction of the glycidyl groups is less than 1%, the molded articles made of the resulting syrup composition will be brittle, while if it is greater than 99%, an increased degree of shrinkage may occur in molding the resulting syrup composition and the molded articles so formed will suffer a loss of gloss and other defects.

The methyl methacrylate syrup composition of the present invention is obtained by blending 1–99 parts by weight of the above-described syrup (A) with 99–1 parts by weight of the above-described syrup (B) in such a way that the sum of the syrups (A) and (B) is 100 parts by weight. If the amount of the syrup (A) is less than 1 part by weight or greater than 99 parts by weight, the molded articles made of the resulting syrup composition will have poor water resistance.

The syrup composition of the present invention can be made into molded articles, for example, according to the following procedure: In a vessel equipped with a stirring device, the syrups (A) and (B) are blended together in the aforesaid proportion, and 100 parts by weight of the resulting syrup composition is mixed with 0.1–10 parts by weight of a catalyst such as azobisisobutyronitrile, benzoyl peroxide, tert-butyl peroxyneodecanoate, tert-butyl peroxypivalate, tert-butyl peroxy-2-ethylhexanoate or the like and 10–300 parts by weight of a filler such as glass fibers, silica sand, alumina or the like. The molding composition so formed is poured into molds having its internal surfaces previously coated with a mold releasing agent such as silicone, polyvinyl alcohol or the like, or onto a release film such as polyester film, cellophane or the like, and then cured at a temperature of 40°–120° C. for a period of about 20–200 minutes.

The practice of the present invention is more specifically explained with reference to the following examples. In these examples, all parts are by weight.

PREPARATION EXAMPLE 1 [PREPARATION OF SYRUP (A)]

Into a flask fitted with a stirrer was charged a mixture consisting of monomers, a polymerization initiator and a chain transfer agent and having the composition given below. This mixture was reacted at 103°–107° C. for 7 hours to obtain a syrup (A-1) having a polymerization degree of 31% and a viscosity of 520 centipoises. In this and following preparation examples, the polymerization degree of a syrup was determined on the basis of its refractive index measured with an Abbe refractometer.

| Methyl methacrylate | 70.0 parts |
| --- | --- |
| Styrene | 25.0 parts |
| Trimethylolpropane trimethacrylate | 3.0 parts |
| Methacrylic acid | 1.6 parts |
| tert-Dodecyl mercaptan | 0.1 part |
| Azobisisobutyronitrile | 0.3 part |
| Total | 100.0 parts |

PREPARATION EXAMPLE 2 [PREPARATION OF SYRUP (A)]

Into the same flask as used in Preparation Examples 1 was charged a mixture consisting of monomers, a polymerization initiator and a chain transfer agent and having the composition given below. This mixture was reacted at 103°–107° C. for 12 hours to obtain a syrup (A-2) having a polymerization degree of 27% and a viscosity of 480 centipoises.

| Methyl methacrylate | 70.0 parts |
| --- | --- |
| Styrene | 25.0 parts |
| Neopentyl glycol dimethacrylate | 3.0 parts |
| N—methylaminoethyl methacrylate | 1.6 parts |
| tert-Dodecyl mercaptan | 0.1 part |
| Azobisisobutyronitrile | 0.3 part |
| Total | 100.0 parts |

PREPARATION EXAMPLE 3 [PREPARATION OF SYRUP (A)]

Into the same flask as used in Preparation Examples 1 was charged a mixture consisting of monomers, a polymerization initiator and a chain transfer agent and having the composition given below. This mixture was reacted at 103°–107° C. for 8 hours to obtain a syrup (A-3) having a polymerization degree of 29% and a viscosity of 480 centipoises.

| Methyl methacrylate | 70.0 parts |
| --- | --- |
| Styrene | 25.0 parts |
| 2-Hydroxyethyl methacrylate | 3.5 parts |
| Trimethylolpropane trimethacrylate | 1.1 parts |
| tert-Dodecyl mercaptan | 0.1 part |
| Azobisisobutyronitrile | 0.3 part |
| Total | 100.0 parts |

PREPARATION EXAMPLE 4 [PREPARATION OF SYRUP (A)]

Into the same flask as used in Preparation Examples 1 was charged a mixture consisting of monomers, a polymerization initiator and a chain transfer agent and having the composition given below. This mixture was reacted at 103°–107° C. for 7 hours to obtain a syrup (A-4) having a polymerization degree of 28% and a viscosity of 460 centipoises.

| Methyl methacrylate | 70.0 parts |
| --- | --- |
| Styrene | 25.0 parts |
| Orthophosphoric ester of 2-hydroxyethyl methacrylate | 3.5 parts |
| Trimethylolpropane trimethacrylate | 1.1 parts |
| tert-Dodecyl mercaptan | 0.1 part |
| Azobisisobutyronitrile | 0.3 part |
| Total | 100.0 parts |

PREPARATION EXAMPLE 5 [PREPARATION OF SYRUP (B)]

Into the same flask as used in Preparation Examples 1 was charged a mixture consisting of monomers, a polymerization initiator and a solvent and having the composition given below. This mixture was polymerized by heating at 110° C. for 8 hours. Then, the toluene was distilled off by heating under reduced pressure to obtain a solid methacrylate copolymer (d) having glycidyl groups. This methacrylate copolymer (d) had a number average molecular weight of 12,000.

| Methyl methacrylate | 25.0 parts |
| --- | --- |
| Styrene | 4.0 parts |
| Glycidyl methacrylate | 10.0 parts |
| Benzoyl peroxide | 1.0 part |
| Toluene | 60.0 parts |
| Total | 100.0 parts |

50 parts of the above methacrylate copolymer (d) was dissolved in 50 parts of a monomer mixture (e) having the composition given below, and the resulting solution was heated at 90° C. for 8 hours to obtain 100 parts of a syrup (B-1) having a viscosity of 1,900 centipoises and an acid value of 3.9.

| Methyl methacrylate | 32.0 parts |
| --- | --- |
| Styrene | 13.0 parts |
| Methacrylic acid | 2.0 parts |
| Trimethylolpropane trimethacrylate | 3.0 parts |
| Monomer mixture (e) | 50.0 parts |

When this syrup (B-1) was analyzed according to a well-known procedure for the determination of epoxy groups, the degree of reaction of the glycidyl groups contained in the copolymer (d) was found to be 61.5%.

PREPARATION EXAMPLE 6 [PREPARATION OF SYRUP (B)]

Into the same flask as used in Preparation Examples 1 was charged a mixture consisting of monomers, a polymerization initiator and a solvent and having the composition given below. This mixture was polymerized by heating at 110° C. for 8 hours. Then, the toluene was distilled off by heating under reduced pressure to obtain a solid methacrylate copolymer (d) having glycidyl groups. This methacrylate copolymer (d) had a number average molecular weight of 7,000.

| Methyl methacrylate | 20.0 parts |
| --- | --- |
| Styrene | 5.0 parts |

| n-Butyl methacrylate | 5.0 parts |
|---|---|
| Glycidyl methacrylate | 8.5 parts |
| Benzoyl peroxide | 1.5 parts |
| Toluene | 60.0 parts |
| Total | 100.0 parts |

50 parts of the above methacrylate copolymer (d) was dissolved in 50 parts of a monomer mixture (e) having the composition given below, and the resulting solution was heated at 40° C. for 6 hours to obtain a syrup (B-2) having a viscosity of 3,100 centipoises and an acid value of 0.8.

| Methyl methacrylate | 33.0 parts |
|---|---|
| Styrene | 10.0 parts |
| 2-Hydroxyethyl methacrylate | 3.0 parts |
| Trimethylolpropane trimethacrylate | 3.0 parts |
| Orthophosphoric ester of 2-hydroxyethyl methacrylate | 1.0 part |
| Monomer mixture (e) | 50.0 parts |

In the case of this syrup (B-2), the degree of reaction of the glycidyl groups contained in the copolymer (d) was 98.6%.

PREPARATION EXAMPLE 7 [PREPARATION OF SYRUP (B)]

50 parts of a methacrylate copolymer (d) prepared according to the procedure described in Preparation Example 5 above was dissolved in 50 parts of a monomer mixture (e) having the composition given below, and the resulting solution was heated at 90° C. for 8 hours to obtain a syrup (B-3) having a viscosity of 3,500 centipoises.

| Methyl methacrylate | 32.0 parts |
|---|---|
| Styrene | 13.0 parts |
| N,N—dimethylaminoethyl methacrylate | 2.0 parts |
| Trimethylolpropane trimethacrylate | 3.0 parts |
| Monomer mixture (e) | 50.0 parts |

In the case of this syrup (B-3), the degree of reaction of the glycidyl groups contained in the copolymer (d) was 30.3%.

PREPARATION EXAMPLE 8 [PREPARATION OF SYRUP (B)]

50 parts of a methacrylate copolymer (d) prepared according to the procedure described in Preparation Example 6 above was dissolved in 50 parts of a monomer mixture (e) having the composition given below, and the resulting solution was heated at 90° C. for 8 hours to obtain a syrup (B-4) having a viscosity of 3,800 centipoises and an acid value of 1.2.

| Methyl methacrylate | 33.0 parts |
|---|---|
| Styrene | 10.0 parts |
| 2-Hydroxyethyl methacrylate | 4.0 parts |
| Methacrylic acid | 0.5 part |
| Trimethylolpropane trimethacrylate | 2.5 parts |
| Monomer mixture (e) | 50.0 parts |

In the case of this syrup (B-4), the degree of reaction of the glycidyl groups contained in the copolymer (d) was 88.0%.

PREPARATION EXAMPLE 9 [PREPARATION OF SYRUP (B)]

50 parts of a methacrylate copolymer (d) prepared according to the procedure described in Preparation Example 5 above was dissolved in 50 parts of a monomer mixture (e) having the composition given below, and the resulting solution was heated at 90° C. for 12 hours to obtain a syrup (B-5) having a viscosity of 3,600 centipoises and an acid value of 2.0.

| Methyl methacrylate | 47.0 parts |
|---|---|
| Methacrylic acid | 3.0 parts |
| Monomer mixture (e) | 50.0 parts |

In the case of this syrup (B-5), th degree of reaction of the glycidyl groups contained in the copolymer (d) was 96.7%.

PREPARATION EXAMPLE 10 ]PREPARATION OF SYRUP (B)]

50 parts of a methacrylate copolymer (d) prepared according to the procedure described in Preparation Example 6 above was dissolved in 50 parts of a monomer mixture (e) having the composition given below, and the resulting solution was heated at 100° C. for 10 hours to obtain a syrup (B-6) having a viscosity of 3,700 centipoises and an acid value of 1.6.

| Styrene | 42.5 parts |
|---|---|
| Methacrylic acid | 2.5 parts |
| Trimethylolpropane trimethacrylate | 5.0 parts |
| Monomer mixture (e) | 50.0 parts |

In the case of this syrup (B-6), the degree of reaction of the glycidyl groups contained in the copolymer (d) was 96.8%.

PREPARATION EXAMPLE 11 [PREPARATION OF SYRUP (C) FOR COMPARATIVE PURPOSES]

In the same flask as used in Preparation Example 5, 50 parts of a methacrylate copolymer prepared according to the procedure described in Preparation Example 5 above was dissolved in 50 parts of the same monomer mixture (e) as used in Preparation Example 5 except that the 2.0 parts of methacrylic acid was replaced by 2.0 parts of methyl methacrylate. Thus, there was obtained 100 parts of a syrup (C) having a viscosity of 1,750 centipoises.

EXAMPLES 1-4 AND COMPARATIVE EXAMPLES 1-3

The syrups obtained in the foregoing Preparation Examples 1, 2, 5, 6 and 11 were blended according to the formulations shown in Table 1 and then cured under the conditions shown in Table 1 to obtain transparent molded articles. In addition, 30 parts of each of the syrup formulations of Table 1 was mixed with 70 parts of powdered silica sand, poured into molds made of stainless steel, aluminum or the like and coated with a mold releasing agent such as silicone, polyvinyl alcohol or the like, and then cured under the curing conditions shown in Table 1 to obtain molded articles having surface gloss. The test results of the transparent molded articles thus obtained are shown in Table 2, while those of the molded articles filled with powdered silica sand are shown in Table 3.

As can be seen from Tables 2 and 3, when the syrup (B) of the syrup composition of the present invention is prepared by reacting part of the glycidyl groups contained in the methacrylate copolymer (d) with a monomer mixture (e) including one or more monomers (ii) having reactivity with glycidyl groups, containing at least one ethylenically-unsaturated bond and being copolymerizable with methyl methacrylate, the molded articles made of the aforesaid syrup composition have excellent water resistance under severe conditions, undergo little shrinkage during cure, exhibit a marked increase in impact resistance, and produce no crack in the cut surfaces when they are cut into products having desired size and shape.

EXAMPLES 5-12

The syrups obtained in the foregoing Preparation Examples 1-8 were blended according to the formulations shown in Table 4 and then cured under the conditions shown in Table 4 to obtain transparent molded articles. In addition, 30 parts of each of the syrup formulations of Table 4 was mixed with 70 parts of powdered silica sand, poured into molds made of stainless steel, aluminum or the like and coated with a mold releasing agent such as silicone, polyvinyl alcohol or the like, and then cured under the curing conditions shown in Table 4 to obtain molded articles having surface gloss. The test results of the transparent molded articles thus obtained are shown in Table 5, while those of the molded articles filled with powdered silica sand are shown in Table 6.

TABLE 1

|  | Example |  |  |  | Comparative Example |  |  |
|---|---|---|---|---|---|---|---|
|  | 1 | 2 | 3 | 4 | 1 | 2 | 3*1 |
| Syrup (A-1) | 49.5 | 49.5 |  |  | 99.0 |  | 49.5 |
| Syrup (A-2) |  |  | 49.5 | 49.5 |  | 99.0 |  |
| Syrup (B-1) | 49.5 |  | 49.5 |  |  |  |  |
| Syrup (B-2) |  | 49.5 |  | 49.5 |  |  |  |
| Syrup (C) |  |  |  |  |  |  | 49.5 |
| Curing conditions |  |  |  |  |  |  |  |
| tert-Butyl peroxy-neodecanoate | 1.0 | 1.0 | 1.0 | 1.0 | 1.0 | 1.0 | 1.0 |
| Temperature (°C.) | 70 | 70 | 70 | 70 | 70 | 70 | 70 |
| Curing time (hrs.) | 1 | 1 | 1 | 1 | 1 | 1 | 1 |

*1 An example given in U.S.S.N. 675,568.

TABLE 2

|  | Example |  |  |  | Comparative Example |  |  |
|---|---|---|---|---|---|---|---|
|  | 1 | 2 | 3 | 4 | 1 | 2 | 3 |
| Immersion in boiling water for 16 hours | Good | Good | Good | Good | Whitening | Whitening | Good |
| Cuttability*2 | Good | Good | Good | Good | Good | Good | Cracked |

*2 The molded article was cut with a commercially available cutting knife and its cut surfaces were examined for cracks.

TABLE 3

|  | Example |  |  |  | Comparative Example |  |  |
|---|---|---|---|---|---|---|---|
|  | 1 | 2 | 3 | 4 | 1 | 2 | 3 |
| Immersion in boiling water for 16 hours | Good | Good | Good | Good | Whitening | Whitening | Good |
| Charpy impact strength (kg/cm$^2$) | 4.8 | 4.7 | 4.7 | 4.6 | 4.2 | 4.0 | 3.1 |
| Linear shrinkage (%) | 0.12 | 0.14 | 0.13 | 0.13 | 1.1 | 1.2 | 0.10 |

TABLE 4

|  | Example |  |  |  |  |  |  |  |
|---|---|---|---|---|---|---|---|---|
|  | 5 | 6 | 7 | 8 | 9 | 10 | 11 | 12 |
| Syrup (A-1) | 49.5 |  |  |  |  |  |  |  |
| Syrup (A-2) |  | 49.5 |  |  |  |  |  |  |
| Syrup (A-3) |  |  | 49.5 | 49.5 | 49.5 |  |  |  |
| Syrup (A-4) |  |  |  |  |  | 49.5 | 49.5 | 49.5 |
| Syrup (B-1) |  |  | 49.5 |  |  | 49.5 |  |  |
| Syrup (B-2) |  |  |  | 49.5 |  |  |  |  |
| Syrup (B-3) |  | 49.5 |  |  | 49.5 |  | 49.5 |  |
| Syrup (B-4) | 49.5 |  |  |  |  |  |  | 49.5 |
| tert-Butyl peroxy-neodecanoate | 1.0 | 1.0 | 1.0 | 1.0 | 1.0 | 1.0 | 1.0 | 1.0 |
| Temperature (°C.) | 70 | 70 | 70 | 70 | 70 | 70 | 70 | 70 |
| Curing time (hrs.) | 1 | 1 | 1 | 1 | 1 | 1 | 1 | 1 |

TABLE 5

|  | Example |  |  |  |  |  |  |  |
|---|---|---|---|---|---|---|---|---|
|  | 5 | 6 | 7 | 8 | 9 | 10 | 11 | 12 |
| Immersion in boiling water for 16 hours | Good | Good | Good | Good | Good | Good | Good | Good |
| Cuttability*2 | Good | Good | Good | Good | Good | Good | Good | Good |

*2 See the note to Table 2

TABLE 6

|  | Example |  |  |  |  |  |  |  |
|---|---|---|---|---|---|---|---|---|
|  | 5 | 6 | 7 | 8 | 9 | 10 | 11 | 12 |
| Immersion in boiling water for 16 hours | Good | Good | Good | Good | Good | Good | Good | Good |

TABLE 6-continued

| | Example | | | | | | | |
|---|---|---|---|---|---|---|---|---|
| | 5 | 6 | 7 | 8 | 9 | 10 | 11 | 12 |
| Charpy impact strength (kg/cm$^2$) | 4.9 | 4.6 | 4.7 | 4.7 | 4.6 | 4.3 | 4.6 | 4.6 |
| Linear shrinkage (%) | 0.11 | 0.12 | 0.13 | 0.13 | 0.17 | 0.14 | 0.12 | 0.13 |

EXAMPLES 13-20

The syrups obtained in the foregoing Preparation Examples 1-10 were blended according to the formulations shown in Table 7 and then cured under the conditions shown in Table 7 to obtain transparent molded articles. In addition, 30 parts of each of the syrup formulations of Table 7 was mixed with 70 parts of powdered silica sand, poured into molds made of stainless steel, aluminum or the like and coated with a mold releasing agent such as silicone, polyvinyl alcohol or the like, and then cured under the curing conditions shown in Table 1 to obtain molded articles having surface gloss. The test results of the transparent molded articles thus obtained are shown in Table 8, while those of the molded articles filled with powdered silica sand are shown in Table 9.

TABLE 7

| | Example | | | | | | | |
|---|---|---|---|---|---|---|---|---|
| | 13 | 14 | 15 | 16 | 17 | 18 | 19 | 20 |
| Syrup (A-1) | 49.5 | 49.5 | | | | | | |
| Syrup (A-2) | | | 49.5 | 49.5 | | | | |
| Syrup (A-3) | | | | | 49.5 | 49.5 | | |
| Syrup (A-4) | | | | | | | 49.5 | 49.5 |
| Syrup (B-5) | 49.5 | | 49.5 | | 49.5 | | 49.5 | |
| Syrup (B-6) | | 49.5 | | 49.5 | | 49.5 | | 49.5 |
| Tert-Butyl peroxyneodecanoate | 1 | 1 | 1 | 1 | 1 | 1 | 1 | 1 |
| Temperature (°C.) | 70 | 70 | 70 | 70 | 70 | 70 | 70 | 70 |
| Curing time (hrs.) | 1 | 1 | 1 | 1 | 1 | 1 | 1 | 1 |

TABLE 8

| | Example | | | | | | | |
|---|---|---|---|---|---|---|---|---|
| | 13 | 14 | 15 | 16 | 17 | 18 | 19 | 20 |
| Immersion in boiling water for 16 hours | Good | Good | Good | Good | Good | Good | Good | Good |
| Cuttability*$^2$ | Good | Good | Good | Good | Good | Good | Good | Good |

*$^2$See the note to Table 2.

TABLE 9

| | Example | | | | | | | |
|---|---|---|---|---|---|---|---|---|
| | 13 | 14 | 15 | 16 | 17 | 18 | 19 | 20 |
| Immersion in boiling water for 16 hours | Good | Good | Good | Good | Good | Good | Good | Good |
| Charpy impact strength (kg/cm$^2$) | 4.7 | 4.6 | 4.6 | 4.6 | 4.8 | 4.4 | 4.5 | 4.6 |
| Linear shrinkage (%) | 0.13 | 0.14 | 0.14 | 0.15 | 0.18 | 0.14 | 0.13 | 0.15 |

We claim:

1. Methyl methacrylate syrup composition comprising an intimate mixture of 1 to 99 parts by weight of a first polymer-in-monomer syrup (A) and 99 to 1 parts by weight of a second polymer-in-monomer syrup (B), the sum of said first syrup (A) and said second syrup (B) being 100 parts by weight, wherein said syrups (A) and (B) are as follows:

(A) a polymer-in-monomer syrup comprising 90 to 40 weight percent of a mixture of monomers which comprises (a) 2 to 95 weight percent of methyl methacrylate monomer, (b) 95 to 1 weight percent of one or more monomers having reactivity with glycidyl groups, containing at least one ethylenically-unsaturated bond, being copolymerizable with methyl methacrylate and being selected from the group consisting of carboxyl-containing monomer, hydroxyl-containing monomer, phosphorus-containing monomer and amino-containing monomer, and (c) 0 to 94 weight percent of one or more monomers not having reactivity with glycidyl groups, containing at least one ethylenically-unsaturated bond, being copolymerizable with methyl methacrylate and selected from the group consisting of acrylate, polyacrylate, polymethacrylate, styrene or its derivatives, fumaric ester and methacrylate except for methyl methacrylate, the sum of said monomers (a), (b) and (c) being 100 weight percent, and 10 to 60 weight percent of a copolymer of said monomers (a), (b) and (c); and (B) a polymer-in-monomer syrup comprising (d) 5 to 95 weight percent of a copolymer of 3 to 97 weight percent of one or more monomers containing at least one glycidyl group and 97 to 3 weight percent of one or more monomers copolymerizable with glycidyl-containing monomers and selected from the group consisting of fumaric ester, maleic ester, styrene, α-methylstyrene, vinyl acetate, methacrylic ester, acrylic ester, methacrylic acid, acrylic acid, methacrylamide, acrylamide, methacrylonitrile and acrylonitrile, having a number average molecular weight of 1,500 to 50,000 and containing unreacted glycidyl groups, and (e) 95 to 5 weight percent of a mixture of monomers comprising (i) 80 to 99.9 weight of one or more monomers selected from the group consisting of methyl methacrylate and the monomers defined in subparagraph (c) in paragraph (A) above, and (ii) 0.1 to 20 weight percent of one or more monomers selected from the monomers defined in subparagraph (b) in paragraph (A) above, said copolymer (d) in said monomer mixture (e) forming a solution, and having said solution react at a temperature between room temperature and 108° C. until 1 to 99 percent of the glycidyl group contained in said copolymer (d) are reacted to provide said syrup (B).

2. The syrup composition of claim 1 wherein said one or more monomers (b) having reactivity with glycidyl groups, containing at least one ethylenically-unsaturated bond and being copolymerizable with methyl methacrylate, which are used for the preparation of said polymer-in-monomer syrup (A), comprise a monomer selected from the group consisting of methacrylic acid, acrylic acid, N-methylaminoethyl methacrylate, 2-hydroxyethyl methacrylate and the orthophosphoric ester of 2-hyrdroxyethyl methacrylate.

3. The syrup composition of claim 1 wherein said one or more monomers (c) not having reactivity with glycidyl groups, containing at least one ethylenically-unsaturated bond and being copolymerizable with methyl methacrylate, which are used for the preparation of said polymer-in-monomer syrup (A), comprise a monomer selected from the group consisting of styrene, 2-methylstyrene, chlorostyrene, tetra-butylstyrene and divinylbenzene.

4. The syrup composition of claim 1 wherein said one or more monomers having at least one glycidyl group, which are used for the preparation of said copolymer (d) having glycidyl groups, comprise glycidyl methacrylate.

5. The syrup composition of claim 1 wherein said one or more monomers copolymerizable with glycidyl-containing monomers, which are used for the preparation of said copolymer (d) having glycidyl groups, comprise a monomer selected from the group consisting of methyl methacrylate, styrene and n-butyl methacrylate.

6. The syrup composition of claim 1 wherein said one or more monomers (i) constituting said mixture of monomers (e) comprise a monomer selected from the group consisting of methyl methacrylate, styrene and trimethylolopropane trimethacrylate.

7. The syrup composition of claim 1 wherein said one or more monomers (ii) constituting said mixture of monomers (e) comprise a monomer selected from the group consisting of methacrylic acid, 2-hydroxyethyl methacrylate, the orthophosphoric ester of 2-hydroxyethyl methacrylate, and N,N-dimethylaminoethyl methacrylate.

8. The syrup composition of claim 1 wherein, in the preparation of said polymer-in-monomer syrup (B), 30 to 99 percent of the glycidyl groups contained in said copolymer (d) are reacted in said mixture of monomers (e).

9. A molded article obtained by subjecting the syrup composition of claim 1 to radical polymerization.

* * * * *